April 23, 1929.   T. H. BARRETT ET AL   1,710,527
BATTERY FEED FOR AUTOMATIC WEFT REPLENISHING LOOMS
Filed Aug. 15, 1927   2 Sheets-Sheet 1

Inventors
T.H.Barrett
Dennis A.Weens
By
Attorney

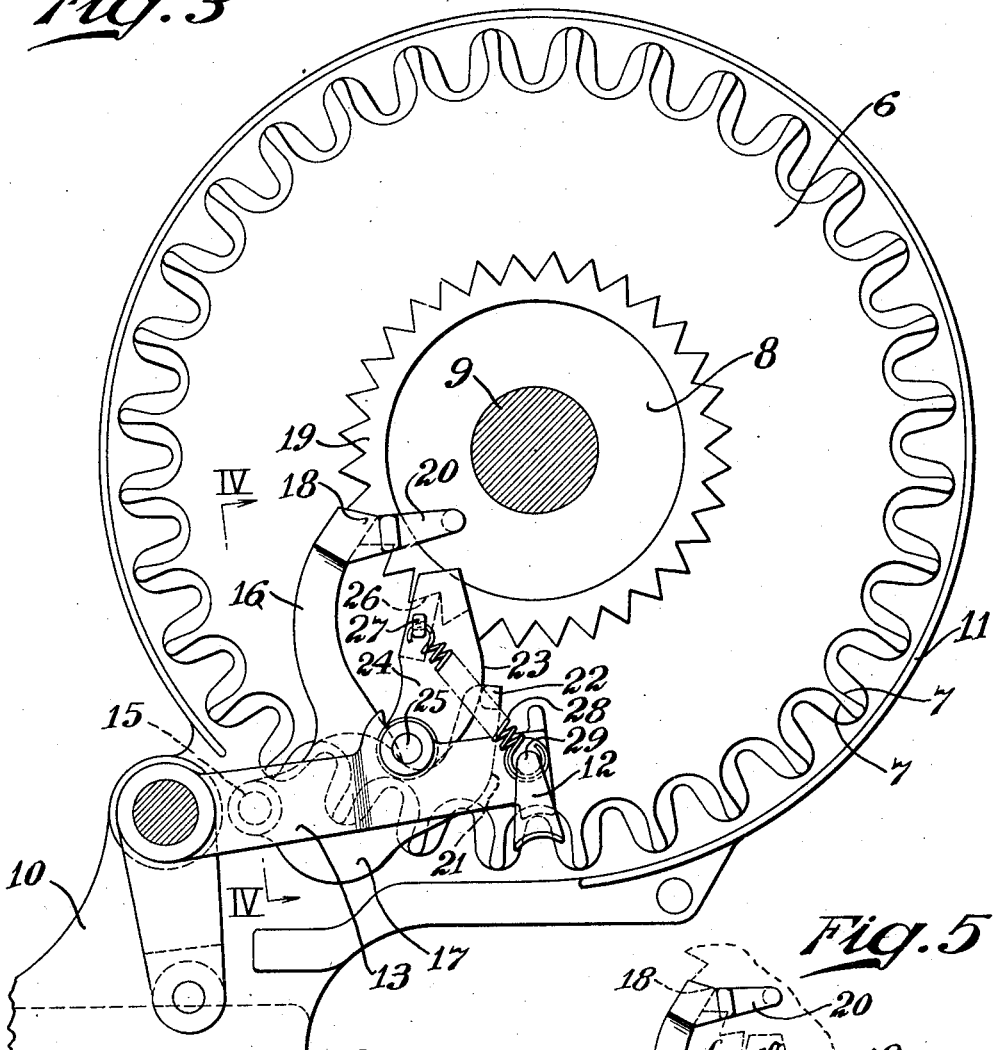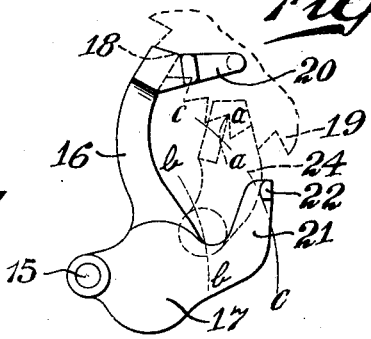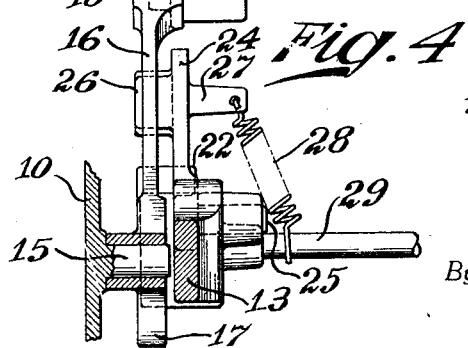

Patented Apr. 23, 1929.

1,710,527

UNITED STATES PATENT OFFICE.

THOMAS H. BARRETT AND DENNIS A. WEEMS, OF BIRMINGHAM, ALABAMA.

BATTERY FEED FOR AUTOMATIC WEFT-REPLENISHING LOOMS.

Application filed August 15, 1927. Serial No. 213,122.

Our invention relates to a feed for the battery or magazine of automatic weft replenishing looms, and has for its object to provide a new design of, and co-operative action between, the stop and feed dogs, whereby the feed dog tooth will be caused always to have a full engagement with a tooth of the battery ratchet so as to avoid the disadvantages of the present feeds resulting from a faulty engagement of the feed dog with the ratchet that cause wear and breakage not only of the ratchet gear teeth, but also damage to and destruction of the filling carriers, shuttles, bobbin supports, transfer hammers, and battery stands which may occur whenever the battery feed fails.

When the transfer mechanism automatically acts to eject an empty filling carrier from the shuttle and insert a fresh filling carrier thereinto from the battery or magazine, the feed dog, following the movement of the hammer, disengages the ratchet wheel on the battery leaving it held only by the counterweighted stop dog, and under such conditions, due to the vibration of the loom, the inertia of the battery, its unbalanced conditions, and other causes, the battery may shift from true position, by which I mean the position in which the returning feed dog would have a full, true and correct engagement with the succeeding tooth of the ratchet. We have conceived that the battery can be held in correct position and the feed dog caused to move always into correct engagement with the battery ratchet teeth by providing the stop dog with an arm or projection disposed to engage the feed dog on the lower side thereof remote from the stop dog, spring means being provided to press the feed dog in the direction to engage this shoulder on the stop dog, thereby pressing the stop dog against the ratchet. Since the feed dog has movement relative to the stop dog as it follows the transfer hammer, we have designed its surface which engages the shoulder on the stop dog so that the feed dog will follow a path of movement controlled by the position of the stop dog, which in turn is controlled by the position of the battery ratchet, the result being that the feed dog when moving into actuating engagement with the ratchet will always be guided into full engagement with the ratchet tooth and will not strike the tip of the teeth and wear or break them off, as the present battery feed mechanisms do.

Our invention further comprises the novel details of construction and arrangements of parts, which are hereinafter more particularly described in the accompanying specification and pointed out in the appended claims, reference, for purposes of illustration, being had to the accompanying drawings which form a part of this specification, and in which:—

Fig. 3 is a full end view of the battery showing the transfer hammer partway on its return stroke with the feed dog engaging the battery ratchet preparatory to advance the same one step.

Fig. 4 is a sectional view partly broken away of the feed mechanism taken on the line IV—IV of Fig. 3.

Fig. 5 is a detail view of the stop dog, showing the feed dog in dotted lines with the dotted curves indicating a typical relative movement of parts.

Similar reference numerals refer to similar parts throughout the drawings.

Figure 1:
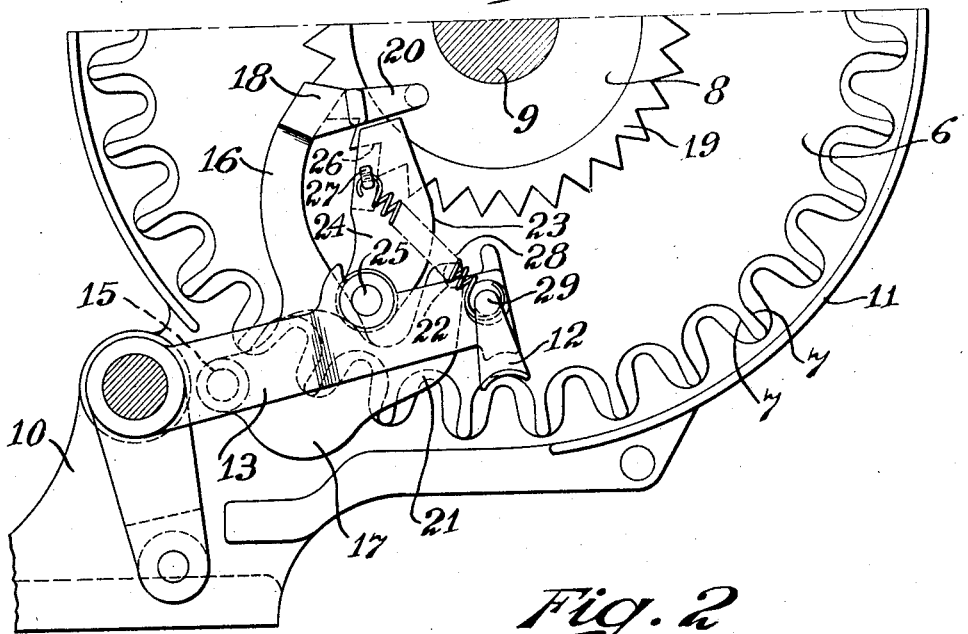
Fig. 1 is a partial view of a battery showing the transfer hammer in its raised position and the dogs in their normal position.

In the embodiment of our invention illustrated, 6 indicates the rotary battery comprising two parallel disks, one only being shown, provided with seats 7 for the butts of the filling carriers, which, for the sake of clearness are not shown, but which may be the ordinary bobbins or quills carrying the weft or filling. The battery has a hub 8 mounted to turn on a stud 9 fast in the battery stand shown at 10. The usual guide 11 on the stand 10 surrounds the battery and serves to hold the filling carriers in position until ready to be transferred by the transfer hammer 12, which is mounted on a bell crank 13 having its depending arm operated by the automatic transfer mechanism, which being well understood by those skilled in this art and forming no part of our present invention, need not be here described or illustrated, it being sufficient to say that when the automatic transfer mechanism is operated the transfer hammer is swung downwardly, knocking the filling carrier presented in position for transfer into the shuttle and forcing the empty carrier therefrom. Mounted on a stud 15 on the stand 10 is a stop dog 16 counterweighted at 17 so as to swing its tooth 18 into engagement with the teeth of a ratchet wheel 19 fast on the battery head. This dog 16 has the usual arm 20 to guide it with reference to the ratchet and it is distinguished from the stop dogs as at present designed by the provision of the arm 21 projecting toward the transfer hammer and upturned so as to provide a lug or shoulder 22 which is adapted to engage the curved face 23 of the feed dog 24, which dog is pivotally mounted by a pin 25 on the transfer hammer and is vertically movable therewith relative to the stop dog. This dog 24 is provided with a tooth or actuating projection 26 offset from its side toward the ratchet 19 and spaced from its end, which end, in the manner well understood, overhangs the ratchet and serves as a guide for this dog while feeding the battery. On its outer or exposed face the dog 24 is provided with a lug 27 to which one end of a coil spring 28 is connected, the other end being secured to the member 29 of the transfer hammer. The action of this spring is to pull the feed dog 24 towards engagement with the projection 22 on the stop dog. The feed dog 24 differs from the conventional feed dogs now in use only in respect of the provision of means for connecting a spring thereto and in the shape of its convex curved face 23. The purposes of the above changes in the construction of the dogs will be understood by reference to a description of the operation of the battery feed which follows.

Figure 2:
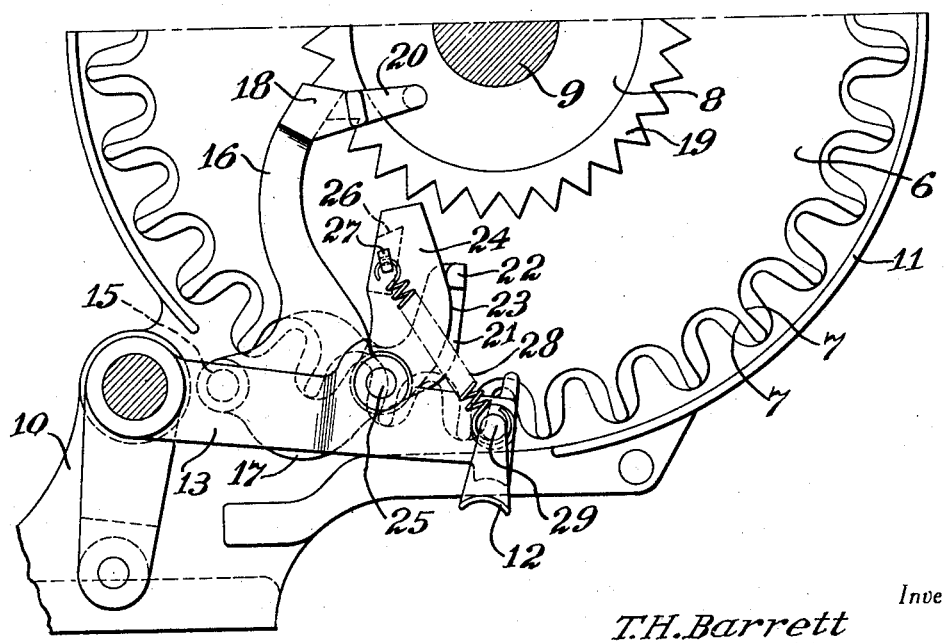
Fig. 2 is a similar view showing the transfer hammer at the limit of its operating stroke.

Fig. 1 shows the transfer hammer at the top of its return stroke, the feed dog 24 standing clear of the lug 22 on the stop dog, the stop dog 16 held by gravity in engagement with one tooth of the ratchet 19, and the tooth 26 on the feed dog held by the spring 28 in full engagement with another tooth of the ratchet. When the transfer mechanism operates at the completion of the operating or down stroke of the hammer, the parts assume the position shown in Fig. 2, it being noted here that the spring 28 has been brought under tension and is pressing the feed dog 24 against the projection 22 and is thus pressing the stop dog 16 firmly against the ratchet wheel. The advantage of this spring pressure thus applied to the stop dog is to hold the battery against displacement due to its inertia or its unbalanced condition, or any other ordinary force that would tend to displace its teeth from the correct position which they should assume before the feed dog operates.

Fig. 3 shows the feed dog assuming engagement with the ratchet with the hammer partway on its return stroke, it being understood that the remaining portion of the hammer's stroke will cause the dog 24 to advance the ratchet one step and feed the battery. Bearing in mind that the spring 28 will be pulling against the feed dog and that the stop dog is mounted on a stationary part, the shoulder 22 thereon will tend to remain stationary as the feed dog moves from the position in Fig. 2 to that in Fig. 3, and thus the curved face of the feed dog 24 will ride past this shoulder 22, causing the tooth 26 on the feed dog 24 to travel in a path which may be straight or may follow the curved line indicated at $a$—$a$ in Fig. 5, it being possible for this curve to be modified by any displacement of the stop dog 16 responsive to movement of the battery, which obviously would swing the shoulder 22 through an arc about the pivot of the stop dog. Thus, when the stop dog is displaced it will only be when the ratchet is out of correct position and such displacement will be automatically transmitted to the feed dog, causing it to be displaced in the direction in which the ratchet is displaced and insuring that as it assumes operative engagement with the ratchet it will do so with a movement which will bring its tooth 26 into contact, not with a tip only of the ratchet tooth, but into a full tooth contact which will therefore preserve the ratchet teeth from damage, insure its long and effective life, and will thus afford a material economy in the maintenance of weft replenishing looms of the automatic type. As the feed dog is moved during the battery actuating portion of its stroke, namely, that occurring in the change of position from the parts shown in Fig. 3, to that shown in Fig. 1, the dog will be carried away slightly from the projection 22 and both dogs will stand in free engagement with the ratchet subject only to the fact that the dog 24 is always under tension from the spring 28 and thus acts to guide it towards the ratchet as it approaches the operating end of its stroke. As the feed dog pivot 25 swings it follows an arc $b$—$b$, shown in Fig. 5, and as the shoulder 22 moves it follows the path indicated by the dotted lines $c$—$c$ in Fig. 5. The movement of the feed dog is a component of these several curves as modified by the relative movement caused by the engagement of its curved surface 23 with the shoulder 22.

Though we have described with great particularity the details of the embodiment of the invention herein shown, it is not to be construed that we are limited thereto, as changes in arrangement and substitution of equivalents may be made by those skilled in the art without departing from the invention as defined in the appended claims.

Having thus described our invention, what we claim as new and desire to secure by Letters Patent, is:—

1. In a battery feed for automatic weft replenishing looms, a rotatable element for the weft carriers having a ratchet, an automatically operable transferrer, a stop dog co-acting with the ratchet and having a fixed pivot, a feed dog adapted to co-act with the ratchet and movable responsive to the transferrer, a guide for the feed dog carried by the stop dog and adapted to engage the feed dog adjacent to its pivot and on the side thereof remote from the stop dog pivot, and spring means to press the feed dog towards said guide.

2. A battery feed for weft replenishing looms according to claim 1, in which the feed dog has a curvilinear face disposed to engage the guide carrier by the stop dog and adapted to direct the feed dog into full tooth engagement with the battery ratchet.

3. In a battery feed for automatic weft replenishing looms, the combination with a battery having a ratchet, a battery stand carrying a stop dog pivotally mounted thereon and engaging the ratchet, a transferrer for ejecting weft carriers from the battery, a feed dog pivotally mounted on an element movable with the transferrer, a spring and co-acting guide elements on the dogs adapted to force the feed dog in advancing towards the battery ratchet to be positively guided into engagement with the base of a ratchet tooth.

4. An automatic feed for weft replenishing looms according to claim 3, in which the co-acting guide elements on the dogs comprise a convexly curved surface on the feed dog on the opposite side thereof from the stop dog, and a guide rigid with the stop dog and adapted to co-act with said convex surface on the feed dog, the spring being disposed to press the feed dog against said guide as it advances to engage the ratchet.

5. In a battery feed for automatic weft replenishing looms, a rotatable element for the weft carriers having a ratchet, an automatically operable transferrer, a stop dog coacting with the ratchet and having a fixed pivot, a feed dog adapted to co-act with the ratchet and movable responsive to the transferrer, guide means for the feed dog and effective to direct said dog in a curvilinear path into full tooth engagement with the ratchet, and a spring for biasing both the feed dog and the stop dog toward the ratchet.

In testimony whereof we affix our signatures.

THOMAS H. BARRETT.
DENNIS A. WEEMS.